United States Patent
Tourneux et al.

(10) Patent No.: US 12,109,856 B2
(45) Date of Patent: Oct. 8, 2024

(54) TIRE COMPRISING AN OPTIMIZED ARCHITECTURE

(71) Applicant: COMPAGNIE GENERALE DES ETABLISSEMENTS MICHELIN, Clermont-Ferrand (FR)

(72) Inventors: Vincent Tourneux, Clermont-Ferrand (FR); Daniel Fabing, Clermont-Ferrand (FR); Patrice Fraysse, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 210 days.

(21) Appl. No.: 17/771,084

(22) PCT Filed: Oct. 22, 2020

(86) PCT No.: PCT/FR2020/051905
§ 371 (c)(1),
(2) Date: Apr. 22, 2022

(87) PCT Pub. No.: WO2021/079066
PCT Pub. Date: Apr. 29, 2021

(65) Prior Publication Data
US 2022/0363094 A1    Nov. 17, 2022

(30) Foreign Application Priority Data
Oct. 23, 2019  (FR) ...................................... 1911850

(51) Int. Cl.
*B60C 9/18* (2006.01)
*B60C 9/20* (2006.01)
(Continued)

(52) U.S. Cl.
CPC .................. *B60C 9/28* (2013.01); *B60C 9/20* (2013.01); *B60C 11/04* (2013.01); *B60C 11/24* (2013.01);
(Continued)

(58) Field of Classification Search
CPC ..................................... B60C 9/18; B60C 9/24
See application file for complete search history.

(56) References Cited

U.S. PATENT DOCUMENTS 6,470,938 B1 * 10/2002 Yokota ...................... B60C 9/18
152/526
8,662,128 B2   3/2014 Maruoka
(Continued)

FOREIGN PATENT DOCUMENTS

DE    10 2013 107475 A1   1/2015
DE    10 2016 202 295 A1   8/2017
(Continued)

OTHER PUBLICATIONS

International Search Report dated Nov. 25, 2020, in corresponding PCT/FR2020/051905 (4 pages).

*Primary Examiner* — Cedrick S Williams
(74) *Attorney, Agent, or Firm* — VENABLE LLP (57) ABSTRACT

A tire (10) for a vehicle comprises a radially outermost working layer (41) which comprises at least one undulation (412) in line with a central rib (251) of the tread (2). The undulation (412) is radially on the outside of the points of the working layer (41) in line with the bottom face (243) of the circumferential groove (24) closest to the undulation (412) and has an amplitude of at least 1 mm. The undulation (412) is vertically in line above at least one local reinforcing layer (6) comprising reinforcing elements that are mutually (Continued)

parallel and make with the circumferential direction (XX') of the tire an angle of which the absolute value is at most equal to 5°.

14 Claims, 2 Drawing Sheets

(51) Int. Cl.
*B60C 9/28* (2006.01)
*B60C 11/04* (2006.01)
*B60C 11/24* (2006.01)
*B60C 11/03* (2006.01)

(52) U.S. Cl.
CPC . *B60C 2009/283* (2013.01); *B60C 2011/0355* (2013.01); *B60C 2200/06* (2013.01)

(56) References Cited

U.S. PATENT DOCUMENTS

| | | | |
|---|---|---|---|
| 11,453,242 | B2 | 9/2022 | Abinal et al. |
| 11,642,917 | B2 | 5/2023 | Abinal et al. |
| 2011/0198006 | A1 | 8/2011 | Asayama |
| 2018/0117970 | A1* | 5/2018 | Le Clerc ............... B60C 9/2003 |
| 2019/0241019 | A1 | 8/2019 | Abinal et al. |
| 2019/0248187 | A1* | 8/2019 | Abinal ................. B60C 9/2009 |
| 2020/0055344 | A1 | 2/2020 | Abinal et al. |
| 2022/0176746 | A1 | 6/2022 | Tourneux et al. |
| 2022/0194131 | A1 | 6/2022 | Fabing et al. |

FOREIGN PATENT DOCUMENTS

| | | |
|---|---|---|
| EP | 3529085 B1 | 4/2021 |
| EP | 3529087 B1 | 4/2021 |
| FR | 2351811 A1 | 12/1977 |
| FR | 3057811 A1 | 4/2018 |

* cited by examiner

TIRE COMPRISING AN OPTIMIZED ARCHITECTURE

BACKGROUND

The present invention relates to a tyre intended to be fitted to a vehicle, and more particularly to the crown of such a tyre.

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The median circumferential plane referred to as the equatorial plane divides the tyre into two substantially symmetrical half-torus shapes, it being possible for the tyre to exhibit tread or architecture asymmetries that are connected with the manufacturing precision or with the sizing.

In the following text, the expressions "radially on the inside of" and "radially on the outside of" mean "closer to the axis of rotation of the tyre, in the radial direction, than" and "further away from the axis of rotation of the tyre, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tyre and an "axial distance" is a distance with respect to the equatorial plane of the tyre. A "radial thickness" is measured in the radial direction and an "axial width" is measured in the axial direction.

In what follows, the expression "in line with" means "for each meridian, radially on the inside substantially within the boundaries of the axial coordinates delimited by". Thus, "the points of a working layer that are in line with a groove" refer, for each meridian, to the collection of points in the working layer that are radially on the inside of the groove within the boundaries of the axial coordinates delimited by the groove.

In the following text, the expression "vertically in line above" means "for each meridian, radially on the outside substantially within the boundaries of the axial coordinates delimited by". Thus, "the central rib vertically in line above the central undulation" denotes, for each meridian, the rib on the tread that is radially on the outside of the central undulation, situated substantially within the boundaries of the axial coordinates delimited by the undulation.

The terms in line with and vertically in line above indicate that there is a connection between the axial widths and the axial positions of the two objects connected by that term.

A tyre comprises a crown comprising a tread that is intended to come into contact with the ground via a tread surface, two beads that are intended to come into contact with a rim, and two sidewalls that connect the crown to the beads. Furthermore, a tyre comprises a carcass reinforcement comprising at least one carcass layer that is radially on the inside of the crown and connects the two beads.

In addition, the tread of a tyre is delimited, in the axial direction, by two lateral surfaces. The tread is also made up of one or more rubber compounds. The expression "rubber compound" denotes a composition of rubber comprising at least an elastomer and a filler.

The crown comprises at least one crown reinforcement radially on the inside of the tread. The crown reinforcement comprises at least one working reinforcement comprising at least one working layer made up of mutually parallel reinforcing elements that form an angle of between 15° and 50° with the circumferential direction. The crown reinforcement may also comprise a hoop reinforcement comprising at least one hooping layer containing reinforcing elements that form an angle of between 0° and 10° with the circumferential direction, the hoop reinforcement usually, although not necessarily, being radially on the outside of the working layers.

For a given meridian, for each layer of reinforcing elements of a crown, working or other reinforcement, a piecewise linear curve, known as the radially exterior curve (REC) of said layer, passes through the radially outermost point of each reinforcing element. For a given meridian, for any layer of reinforcing elements of a crown, working or other reinforcement, a piecewise linear surface, known as the radially interior curve (RIC) of said layer, passes through the radially innermost point of each reinforcing element. The radial distances between a layer of reinforcing elements and any other element of the tyre are measured, on a meridian cross section, from one or the other of these curves and in such a way as not to incorporate the radial thickness of said layer. If the measurement point, associated with the second element, is radially on the outside of the layer of reinforcing elements, the radial distance is measured from the radially exterior curve REC to this point and, respectively, from the radially interior curve RIC to the other measurement point if the latter is radially on the inside of the layer of reinforcing elements. This makes it possible to consider radial distances that are coherent from one meridian to the other, without it being necessary to take into account possible local variations associated with the shapes of the cross sections of the reinforcing elements of the layers.

In order to obtain good grip on wet ground, cuts are made in the tread. A cut denotes either a well, or a groove, or a sipe, or a circumferential groove, and forms a space opening onto the tread surface.

A sipe or a groove has, on the tread surface, two characteristic main dimensions: a width W and a length Lo, such that the length Lo is at least equal to twice the width W. A sipe or a groove is therefore delimited by at least two main lateral faces that determine its length Lo and are connected by a bottom face, the two main lateral faces being at a non-zero distance from one another, referred to as the width W of the sipe or of the groove.

The depth of the cut is the maximum radial distance between the tread surface and the bottom of the cut. The maximum value for the depths of the cuts is referred to as the tread depth D.

A circumferential groove is a groove that is substantially circumferential, and the lateral faces are substantially circumferential in the sense that their orientation can vary locally around plus or minus 45° about the circumferential direction, but that all of the patterns that belong to the circumferential groove can be found all around the tread, forming a substantially continuous set, i.e. one that exhibits discontinuities representing less than 10% by length compared with the length of the patterns.

The circumferential grooves or a circumferential set of grooves arranged around the entire circumference of the tyre, constitute the circumferential rib boundaries. A rib is a substantially circumferential and substantially continuous raised element made up of the tread pattern elements either contained between an axial edge of the tyre and the nearest axially outermost circumferential boundary, or contained between two circumferential boundaries. The ribs are substantially continuous in so far as grooves with a thickness and/or width that is notably smaller than those of the circumferential grooves may be situated in the rib. Furthermore, the rib is substantially circumferential insofar as its circumferential boundaries may have a variation in axial position along the meridian concerned because a circumferential groove may have circumferentially undulating lateral faces. In that case, the width of the rib is the minimum axial distance between two points on the two boundaries of the rib, whatever the meridian or meridians to which they belong.

A tyre needs to meet numerous performance criteria relating to phenomena such as wear, grip on various types of ground, rolling resistance and dynamic behaviour. These performance criteria sometimes lead to solutions that compromise other criteria. In order to improve the overall performance trade-off it is possible to undulate the working layers as disclosed in patent applications EP35229085A1, EP35229087.

In the current context of sustainable development, the saving of resources and therefore of raw materials is one of the industry's key objectives. For passenger vehicle tyres, one of the avenues of research for this objective consists in reducing the mass and thus the breaking strength of reinforcing elements that reinforce the various layers that make up the crown reinforcement or the carcass reinforcement.

However, reducing the breaking strength of the tyre reinforcing elements has the drawback of lowering the resistance of the crown to puncturing by certain objects. Thus, regulations exist, notably American (ASTM WK20631) and Chinese (GB 9743-2007) regulations, which are based on the measurement of the energy necessary for an indenter to penetrate the crown of the tyres. The lowering of the resistance to puncturing caused by the use, in a tyre, of reinforcing elements having a lower breaking strength, has the consequence that these tyres no longer comply with these regulations. These tyres thus become unfit for sale in these countries, and for import both as spare parts and in a state fitted to vehicles. Compliance with these regulations is consequently a significant commercial issue for all manufacturers, whether or not they manufacture in these countries.

These penetration tests are commonly known as "breaking energy tests". The breaking energy of the tyre under the test conditions imposed by the regulations is thus referred to as "breaking energy performance". The tests and the associated performance will be referred to in this way in the rest of the document. For tyres of the one same type, namely manufactured in the one same factory, with the same architecture and the same tread, there is a spread of almost 10% on the results.

For this type of performance, the breaking strength of the reinforcing elements of the working layers is considered to be of key importance, as shown by the patent U.S. Pat. No. 8,662,128, via the reinforcement thereof either by increasing the density, or by increasing the diameter of the elementary threads of the reinforcing elements of the working layers. It is also possible to add a layer of local reinforcement, of which the reinforcing elements make an angle with the longitudinal axis of between 20 and 90° (DE102016202295, DE102013107475), between the carcass reinforcement and the working reinforcement. However, these solutions run counter to the primary objective of the inventors, which is to save on mass and raw materials, or to improve on performance for the same mass.

The key objective of the present invention is therefore to increase the performance in terms of resistance to penetration of a tyre without impairing the other aspects of the performance of the tyre.

SUMMARY OF THE INVENTION

This objective is achieved by a tyre comprising:
- a tread intended to come into contact with the ground via a tread surface, a circumferential midplane passing through the centre of the tread, the tread surface comprising grooves, the grooves forming a space opening onto the tread surface and being delimited by at least two main lateral faces connected by a bottom face,
- at least one and at most two central ribs, delimited by circumferential boundaries, the circumferential boundaries of the central ribs being substantially circumferential grooves referred to as circumferential grooves or a circumferential set of grooves, a central rib being such that the circumferential midplane passes between its two boundaries or, if the circumferential midplane passes through a circumferential groove, such that the circumferential midplane passes a distance at most equal to 15 mm from one of the boundaries of said central rib, the circumferential grooves or the grooves of the circumferential set of grooves that form the boundaries of the central rib or ribs having a width W defined by the distance between two lateral faces at least equal to 5 mm and a depth D defined by the maximum radial distance between the tread surface and the bottom face at least equal to 2 mm,
- a crown reinforcement, radially on the inside of the tread, comprising a working reinforcement, and a carcass reinforcement radially on the inside of the crown reinforcement comprising at least one carcass layer, the working reinforcement comprising at least one working layer, each working layer extending radially from a radially interior curve to a radially exterior curve, each working layer comprising at least partially metal reinforcing elements coated with an elastomer material which are mutually parallel and make with the circumferential direction of the tyre an angle of which the absolute value is at least equal to 15° and at most equal to 50°, the radially outermost working layer comprising at least one central undulation in line with at least one central rib with an amplitude at least equal to 1 mm, each central undulation being such that the portion of the working layer of the central undulation is radially on the outside of the portion of the working layer in line with the bottom faces of the circumferential grooves or of the grooves of the circumferential set of grooves delimiting the central rib in a vertical line above the central undulation concerned,
- at least one local reinforcement, comprising at least one layer of reinforcing elements that are mutually parallel and make with the circumferential direction of the tyre an angle of which the absolute value is at most equal to 5°, being vertically in line above at least one central undulation of the radially outermost working layer.

DETAILED DESCRIPTION

The principle behind the invention is therefore to create at least one undulation about the equator plane, on at least the radially outermost working layer in line with at least one rib of the tread. This or these undulations bring part of said working layer closer to the tread surface because this part of the undulation is radially on the outside of the part of said layer that is in line with the circumferential grooves or the grooves of the circumferential set of grooves delimiting said rib which, given its proximity to the equator plane, is referred to as a central rib. The amplitude of the undulation is at least equal to the diameter of the reinforcing elements of the local reinforcement that will be positioned in line with said undulation. Steps will be taken to ensure that the radially outermost crown layer is not radially on the outside of the radially outermost point of the tyre wear indicator so as to ensure that this layer does not become damaged through contact with the ground at the end of the life of the tyre.

To an approximation, at least regarding the radially outermost working layer of the tread surface under the ribs closest to the equator plane, when axial and/or transverse loads are applied to said ribs, the volume of rubber that is deformed is reduced by comparison with solutions in which there is no undulation of the radially outermost working layer. As a result, under transverse or circumferential loadings, the amplitude of the deformation of said rib is reduced and therefore the behaviour and rolling resistance of the tyre are improved. By adjusting the axial width of the local reinforcement or reinforcements to suit the dimension of the undulations and therefore of the ribs vertically in line above them, it is possible to limit the addition of local reinforcement to the strict minimum required.

Experience shows that in order to improve the performance in terms of dynamic behaviour under transverse load, one of the criteria which is sufficient in itself is to decrease the distance (do) between the radially exterior curve (REC) of the radially outermost working layer vertically in line above the undulation, and the tread surface. This makes it possible to reduce the sheared thicknesses of rubber materials of the tread and to reduce the production of heat caused by the hysteresis of these materials. These effects are beneficial both to the stiffness of the tread, which is dependent on temperature, and to the performance in terms of rolling resistance and endurance. Undulating the working layer additionally makes it possible to increase the stiffness of the tyres under transverse or circumferential loadings by increasing the flexural inertia on the edge of the crown, something which leads to an appreciable improvement in behavioural performance. In some tyres, the crown reinforcement comprises only one working layer, and the invention also works in such cases. The crown reinforcement may comprise other layers of reinforcing elements such as, for example, a hooping layer.

The amplitude of the undulation of a working layer is measured on one or more meridian sections. The amplitude is equal to the radial distance between the radially outermost point of the working layer concerned underneath the rib concerned and the radially innermost point of said layer in line with the bottom face of the circumferential grooves or of the grooves that make up the circumferential boundaries of said rib. In order to measure the amplitude of the working layer, these two points will be of the same kind as far as geometry of the working layer is concerned. They will both be measured either on the neutral axis or on the radially interior curve (RIC) or on the radially exterior curve (REC) of the working layer concerned.

The amplitude of this undulation has to be at least equal to 1 mm in order to have significant effects on the scale of the tyre. Thus, the radial distance (do) between the radially exterior curve (REC) of the radially outermost working layer and the tread surface is at least 1 mm less than the radial distance (dc) between the radially exterior curve (REC) of the radially outermost working layer and the tread surface, this distance being measured vertically in line with the bottom face of the circumferential groove or of the grooves that make up the circumferential boundaries of the rib vertically in line above said undulation.

Nevertheless, the presence of this or these undulations has the effect of locally moving one or more layers of the crown reinforcement away from the layer or layers of the carcass reinforcement. Now, the inventors behind the invention have found that the breaking energy performance is dependent, amongst other things, on the mechanical coupling between the layers of the crown reinforcement and the layer or layers of the carcass reinforcement. Specifically, the more radially separated the layers of the reinforcements are from one another, the less mechanical coupling there is and the poorer the performance in terms of breaking energy. Thus, with an amplitude of at least 1 mm, the mechanical coupling is significantly reduced and the breaking energy performance is significantly impaired unless a local reinforcement, arranged radially between the carcass reinforcement and the radially outermost working layer is provided, in accordance with the invention. Such a local reinforcement is able, on the one hand, to restore or even improve the performance in the breaking energy test by comparison with a tyre that does not have an undulation and, on the other hand, to create the undulation by moving the radially outermost working layer radially away from the layer or layers of the carcass reinforcement.

Thus, the invention makes it possible to improve the breaking energy performance by the order of 15%, but without adding volume of materials, unlike in the solutions with local reinforcements not positioned in undulations of the radially outermost working layer or working layers.

The breaking energy test is performed by positioning an indenting tool on a rib rather than in a circumferential groove. Positioning it in a circumferential groove would reduce the distance from the indenting tool to the crown reinforcement and to the carcass reinforcement and would therefore reduce the bending forces applied to these elements during the test. For this reason, the indenting tool is always positioned on a rib. There is therefore no longer any benefit in having a local reinforcement beyond the ribs insofar as the reinforcing elements of the local reinforcement are long enough to absorb load in a way coupled with the reinforcing elements of the other crown layers of reinforcing elements. Were that not the case, very short reinforcing elements, having the axial width of a rib, would behave in the same way as a broken element of a layer of reinforcing elements and would not provide any more resistance to the progression of the indenting tool. In order to have reinforcing elements that are long, but the axial width of which is limited by the width of the rib, the idea is to position them at an angle, to the circumferential direction (XX') of the tyre, which in terms of absolute value is at most equal to 5°.

Furthermore, the breaking energy test does not specify, in instances in which there is a circumferential groove passing through the centre of the tread, on which of the two central ribs of this type of tread pattern the indenting tool is to be positioned. In order to improve the result of the test, all that is required is for a local reinforcing layer to be positioned in line with an undulation of the radially outermost working layer in line with one of the central ribs situated on either side of said circumferential groove. Given the size of the circumferential grooves, the two central ribs that there are in such an arrangement can be defined as a rib such that the circumferential median plane passes at a distance at most equal to 15 mm from one of the boundaries of said central rib.

With the angle made by the reinforcing elements of the local reinforcing layer with respect to the circumferential axis being restricted to at most 5° in terms of absolute value, the reinforcing elements of the local reinforcement or reinforcements are long enough to be better coupled to the other reinforcing elements of the crown or carcass reinforcing layers between which they are placed. Specifically in such cases, the reinforcing elements of the local reinforcement may be continuous threads or strips of threads laid circumferentially.

Furthermore, and astonishingly, the invention reduces the spread on the breaking energy test by at least 25% and therefore allows better control over the performance.

In order to achieve improvements in rolling resistance and in behaviour without any impairment in endurance performance, it is advantageous for the amplitude of each central undulation of the radially outermost working layer to be at least equal to 1.5 mm, preferably at least equal to 2 mm and at most equal to 5 mm, preferably at most equal to 3 mm.

In order to leave the working layers coupled across their entire axial width, one preferred solution is for the local reinforcement to be positioned between the carcass reinforcement and the radially innermost working layer. It is therefore preferable for the local reinforcement to be radially on the outside of the carcass reinforcement radially on the inside of the radially innermost working layer.

In order to improve the reliability of the tyre performance in terms of crown attack endurance, it is advantageous for the radially outermost working layer to comprise a central undulation in line with each central rib, each central undulation being vertically in line above a local reinforcement.

In order to be effective, it is advantageous for the axial width of each local reinforcement to be at least equal to 5 mm and at most equal to the axial width of the central rib in vertical line above said local reinforcement.

The performance is even more advantageous if each local reinforcement (6) comprises a layer of reinforcing elements that are mutually parallel and form with the circumferential direction (XX') of the tyre an oriented angle of which the absolute value is at most equal to 0.5°, preferably at most equal to 0.2°, preferably equal to 0°. In such cases, the local reinforcement is made up of a continuous reinforcing element laid circumferentially individually or in strips of several reinforcing elements. In instances in which a single reinforcing element is laid, the various turns of said reinforcing element make up the mutually parallel reinforcing elements.

It is possible to use metal threads or cords for the layer or layers of the local reinforcement. Nevertheless, in order to reduce weight, facilitate flattening and improve the noise performance of the tyre, it is advantageous for the reinforcing elements of each local reinforcement to be made of textile, preferably of the aliphatic polyamide, aromatic polyamide, a combination of aliphatic polyamide and of aromatic polyamide, polyethylene terephthalate or rayon type, and mutually parallel, each of these materials offering different advantages in this context of strength and elongation at break, amongst other criteria. As a preference, the reinforcing elements of the local reinforcement have a radial thickness at most equal to 1.5 mm.

For the invention to work well, it is preferable for the force at break of the reinforcing elements of each local reinforcement to be at least equal to 20 daN, at most equal to 120 daN, and for their elongation at break Acc to be at least equal to 6%, preferably at most equal to 30%, all measured in accordance with the ASTM D885/D885M –10A standard of 2014.

For improved productivity, one embodiment of the invention is for each undulation of the radially outermost working layer to be in vertical alignment above at most one local reinforcement, each local reinforcement being produced by continuously winding a strip of at least two reinforcing elements to generate at most 3 layers of reinforcing elements. The multiple thicknesses may be obtained by successive windings of one or more strips, but also by overlapping whereby a strip is overlapped between two turns of laying.

In order to prevent rubbing between the reinforcing elements of the local reinforcement or reinforcements, the axial distance between two contiguous reinforcing elements of the local reinforcement is at least equal to 0.2 mm and at most equal to 0.4 mm in order to maintain optimal breaking energy performance.

When the tyre has two working layers, one achievable solution that makes it possible to minimize the amplitudes of the undulations of each working layer is for a first local reinforcement to be radially on the outside of the carcass reinforcement, radially on the inside of the radially innermost working layer and for a second local reinforcement to be radially on the outside of the radially innermost working layer and radially on the inside of the radially outermost working layer.

One of the advantages of the invention is that, by comparison with the prior art in which the addition of a local reinforcement is made without coupling it to the ribs of the tread, the reinforcing elements of the carcass layer or layers have a meridian curvature of constant sign in line with the narrowest working layer of the crown reinforcement. This makes it possible to avoid a local buckling of the layer or layers of the carcass reinforcement and therefore preserve the endurance thereof.

The invention requires a number of special arrangements during manufacture. The addition of a local reinforcement of which the angle is close to 0° under a rib will, depending on the laying tension, disturb the flattening of said rib and therefore risk generating uneven wearing of the axial edges of the rib. This problem can be overcome by regulating the tension with which the reinforcing elements of the local reinforcement are laid. The more ribs there are with local reinforcements in line with them, the more complex will be the regulation required during manufacture. In order to reduce this complexity, it is therefore advantageous for an undulation of the radially outermost working layer to be present only in line with the central ribs.

Laying such local reinforcing layers with a laying tension is easier to achieve on tyres that are manufactured on a hard core, which is a method known to those skilled in the art and will enable the post-cure geometry of the tyre to be ensured easily. Nevertheless, it is also possible to achieve laying such a layer with a laying tension in a method employing a tyre building drum.

By contrast, for improvements in terms of behaviour and in terms of rolling resistance, it is advantageous for an undulation of the radially outermost working layer to be present in line with all the ribs of the tread.

In order to maximize the performance of the crown reinforcement in terms of puncturing and not solely in terms of the breaking energy test, it is advantageous for a local reinforcement to be present in line with all the undulations of the radially outermost working layer.

For optimum performance in terms of puncturing and attack of the crown, in the region of the grooves or of the circumferential grooves, without penalizing the rolling resistance, the radial distance (d1) between the radially exterior curve (REC) of the radially outermost working layer and the bottom face of the circumferential grooves is at least equal to 1 mm and at most equal to 5 mm, preferably at least equal to 2 mm and at most equal to 4 mm. Below the lower limits, the tyre may prove too sensitive to attack. Above the upper limits, the rolling resistance of the tyre would be penalized.

The amplitude of the undulation is at least equal to 1 mm, but limited to 5 mm because of the radii of curvature to be imparted on the metal working layers, which are stiff and therefore not very deformable.

It is advantageous for the tread, for example in a groove or a circumferential groove of the tread, to comprise at least one wear indicator, and for the minimum radial distance (du) between the radially exterior curve (REC) of the radially outermost layer of the crown reinforcement and the tread surface to be at least equal to the radial distance (df) between the tread surface and the radially outermost point of the wear indicator. Specifically, it is important for the user to be able to see that the tyre is worn, using the wear indicator, and to be able to do so before the reinforcing elements of the radially outermost layer of the crown reinforcement begin to appear on the tread surface.

Advantageously, the minimum radial distance (du) between the radially exterior curve (REC) of the radially outermost layer of the crown reinforcement and the tread surface is at most equal to the depth D of the closest circumferential groove, increased by 2 mm, and at least equal to the depth D of the closest circumferential groove, decreased by 2 mm. This solution allows ideal positioning of the radially outermost layer of reinforcing elements of the crown reinforcement, and the tread surface. The minimum radial distance (du) between the radially exterior curve (REC) of the radially outermost layer of the crown reinforcement and the tread surface has to be measured over the radially outer portion of the crown reinforcement, and therefore at an undulation.

For preference, the depth D of a major groove or of a circumferential groove is at least equal to 6 mm and at most equal to 20 mm. Tread pattern depths of between 6 and 10 mm allow a good compromise between wearing and rolling resistance performance aspects in many passenger vehicle tyres. Tread pattern depths of between 10 and 20 mm are attractive for the same compromises in tyres for vehicles that carry heavy loads. The invention is not limited to tyres for a particular use.

In cases in which the radially outermost layer of reinforcing elements is a hooping layer, it is advantageous for the reinforcing elements of said layer to be made of textile, preferably of the aliphatic polyamide, aromatic polyamide type, of a type involving a combination of aliphatic polyamide and aromatic polyamide, of polyethylene terephthalate or of rayon type, which are mutually parallel and form an angle B at most equal to 10°, in terms of absolute value, with the circumferential direction (XX') of the tyre.

It is preferable for the crown reinforcement to consist of 2 working layers of opposite angles and one hooping layer, as in numerous present-day crown reinforcements.

BRIEF DESCRIPTION OF THE FIGURES

The features and the other advantages of the invention will be understood better with the aid of FIGS. 1 to 5, said figures not being drawn to scale but in a simplified manner so as to make it easier to understand the invention.

Numerous combinations of arrangements and dimensions of the undulations under the ribs, and of circumferential sets of grooves, are possible. The figures and the description do not attempt to describe all of these explicitly.

Figure 1:
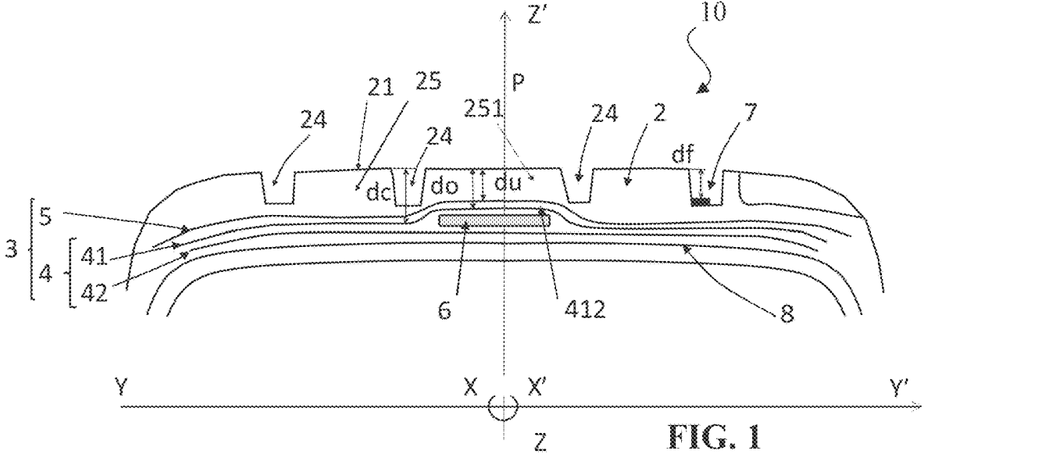
FIG. 1 depicts a meridian section through the crown of a tyre according to the invention, with an undulation (412) in line with the central rib (251) through which the median circumferential plane (P) passes. It illustrates the local reinforcing layer (6), positioned under the undulation (412) of the radially outermost working layer (41) and the various radial distances do, du, dc and df.

FIG. 1 schematically depicts the meridian section through the crown of the tyre 10 according to the invention. A Cartesian frame of reference (XX', YY', ZZ') is associated with each meridian plane. The tyre 10 has a tread 2 intended to come into contact with the ground via a tread surface 21. Arranged in the tread are grooves and circumferential grooves 24 delimiting ribs 25 including the central rib 251 through which the median circumferential plane P passes. In at least one of the circumferential grooves 24, the tyre 10 comprises at least one wear indicator 7. The tyre 10 also comprises a crown reinforcement 3 comprising a working reinforcement 4 and in this case, for example, a hoop reinforcement 5. The working reinforcement comprises at least one working layer and here, for example, two working layers 41 and 42, each comprising mutually parallel reinforcing elements. The crown reinforcement 3 is radially on the outside of a carcass reinforcement 8. FIG. 1 also depicts, in line with this central rib 251, an undulation 412 of the radially outermost working layer 41 and, in line with this undulation, a local reinforcing layer 6. In this variant, only the radially outermost working layer 41 is undulated.

Figure 2:
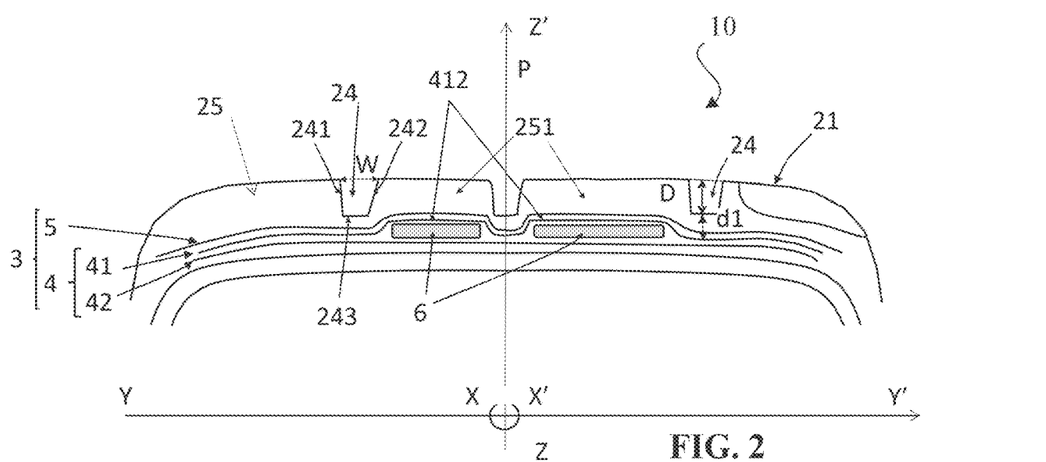
FIG. 2 depicts a meridian section through the crown of a tyre according to the invention, with an undulation (412) and a local reinforcement layer (6) in line with each central rib (251) on either side of the central groove through which the median circumferential plane (P) passes. It also illustrates the distances W, D and d1.

FIG. 2 depicts a variant of the invention with an undulation 412 and a local reinforcing layer 6 in line with each central rib 251, on either side of the circumferential groove through which the median circumferential plane P passes. The figure depicts the circumferential grooves which each have lateral faces 241 and 242 and a bottom face 243 and a width W, which is the maximum axial distance between the lateral faces, which possibly differs from one circumferential groove 24 to the other. In this variant, only the radially outermost working layer 41 is undulated.

Figure 3:
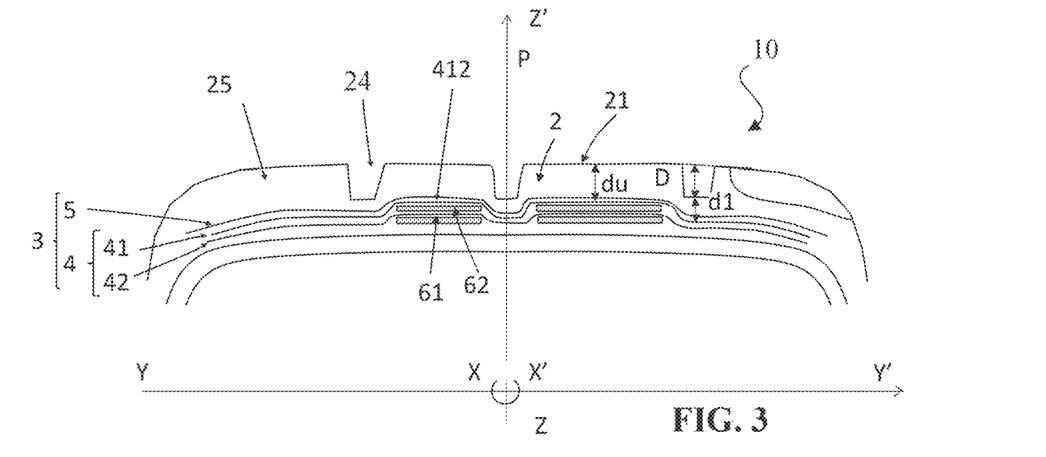
FIG. 3 depicts a meridian section through the crown of a tyre according to the invention, with an undulation (412) and two local reinforcing layers (61, 62) in line with each central rib (251) respectively under each working layer (41, 42) on either side of the central groove through which the median circumferential plane (P) passes.

FIG. 3 depicts a variant of the invention similar to that of FIG. 2, with 2 central ribs 251 although, in this variant, the two working layers 41 and 42 are undulating, and a local reinforcing layer is positioned under each undulation.

FIGS. 1, 2 and 3 depict the following radial distances:

D: the depth of a groove, which is the maximum radial distance between the tread surface 21 and the bottom face 243 of the circumferential groove 24, dc: the radial distance between the radially exterior curve REC of the radially outermost working layer 41 and the tread surface 21, which is the distance in line with the bottom face 243 of the circumferential groove 24 closest to the said undulation 412.

df: the radial distance between the tread surface 21 and the radially outermost point of the wear indicator 7.

do: the radial distance between the radially exterior curve REC of the radially outermost working layer 41 and the tread surface at the undulation 412.

du: the minimum radial distance between the radially exterior curve (REC) of the radially outermost layer of the crown reinforcement 3 and the tread surface 21.

d1: the radial distance between the radially exterior curve REC of the radially outermost working layer 41 and the bottom face 243 of the circumferential grooves 24.

A meridian section through the tyre is obtained by cutting the tyre on two meridian planes. This or these sections serve to determine the various radial distances.

Figure 4:
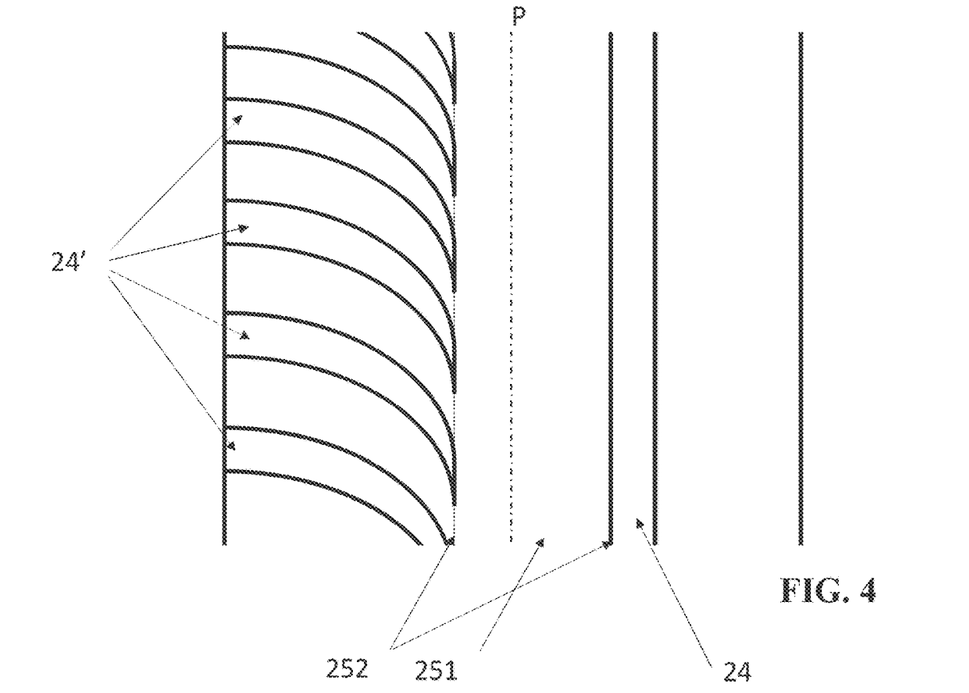
FIGS. 4 and 5 depict tread patterns of a tread, and notably a circumferential set of grooves (24') forming one of the circumferential boundaries (252) of the central rib (251).
Figure 5:
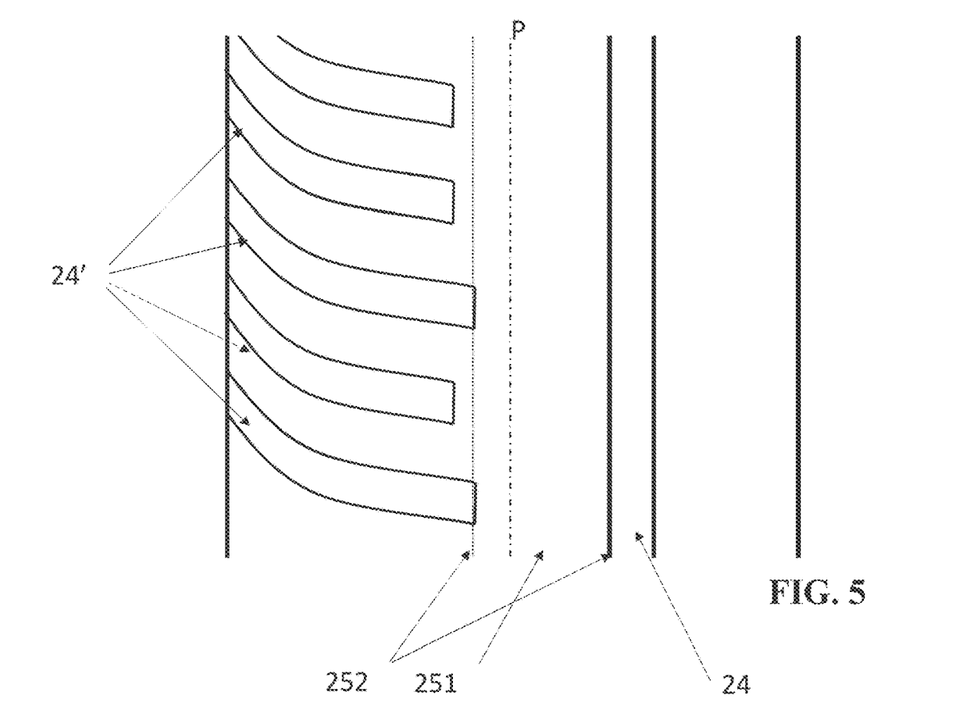

FIGS. 4 and 5 depict treads in which a rib 251 is delimited by a circumferential groove 24 one side, and by a circumferential set of grooves 24' on the other side. FIG. 4 depicts a circumferential set of grooves 24', for which the circumferential boundary 252 of the central rib is obvious. FIG. 5 depicts a circumferential set of grooves 24' for which the axial position of the grooves of said set varies. In this case, the boundary 252 of the central rib is only substantially axial. In this case, just as in the case of a substantially circumferential groove, said boundary passing through those points on said boundary 252 that are closest to the centre of the central rib are extrapolated as a circumferential plane.

The invention was implemented on a tyre A of size 295/35R20 intended to equip a passenger vehicle. The depths D of the grooves of the tread pattern are comprised between 4 and 7 mm and equal to 7 mm in the case of the circumferential grooves, for widths W which are variable in the case of the grooves and equal to 15 mm in the case of the circumferential grooves. The crown reinforcement is made up of two working layers of which the reinforcing elements make an angle of + or −38° with the circumferential direction and of a hooping layer of which the reinforcing elements make an angle of + or −3° with the circumferential direction.

The radially outermost working layer is undulated under the central rib of the tread. The amplitude of the undulation under the central rib is 1.2 mm. The axial width of the undulation is equal to 21 mm. Positioned in the undulation is a local reinforcing layer with an axial width of 20 mm made up of a nylon-aramid hybrid with a diameter equal to 0.65 mm and a laying pitch of 0.85 mm. The radial distance d1 between the radially exterior curve REC of the radially outermost working layer 41 and the bottom face 243 of the circumferential grooves 24 is between 2 mm and 3.5 mm.

Tyres A were compared with tyres B of the same size, having the same characteristics except that the working layers were not undulated, and had no local reinforcing layer.

The improvement in terms of rolling resistance was evaluated on a standard machine for measurements standardized in accordance with ISO 2850 :2009. The tests reveal a more than 2% improvement by comparison with the reference tyre B.

Furthermore, a measurement of the characteristic Dz of the Pacejka tyre behaviour model well known to a person skilled in the art reveals a 2-to-3% improvement in this characteristic for a pressure of 2.6 bar, hot. The improvement in dry grip varies between 0 and 1% depending on the stress loading conditions.

The improvement in breaking energy performance of tyre A in comparison with tyre B is 15% without an increase in mass.

The invention claimed is:

1. A tire, for a vehicle, comprising:
a tread intended to come into contact with a ground via a tread surface, a circumferential midplane passing through the center of the tread, the tread surface comprising grooves, the grooves forming a space opening onto the tread surface and being delimited by at least two main lateral faces connected by a bottom face,
at least one and at most two central ribs, delimited by circumferential boundaries, the circumferential boundaries of the central ribs being substantially circumferential grooves, the substantially circumferential grooves being circumferential grooves or a circumferential set of grooves, a central rib being such that the circumferential midplane passes between its two boundaries or, if the circumferential midplane passes through a circumferential groove, such that the circumferential midplane passes a distance at most equal to 15 mm from one of boundaries of the central rib or ribs, the circumferential grooves or the grooves of the circumferential set of grooves that form the boundaries of the central rib or ribs having a width defined by a distance between two lateral faces at least equal to 5 mm and a depth defined by a maximum radial distance between the tread surface and the bottom face at least equal to 2 mm,
a crown reinforcement, radially on an inside of the tread, comprising a working reinforcement, and a carcass reinforcement radially on an inside of the crown reinforcement comprising at least one carcass layer, the working reinforcement comprising at least one working layer, each working layer extending radially from a radially interior curve to a radially exterior curve, each working layer comprising at least partially metal reinforcing elements coated with an elastomer material which are mutually parallel and make with a circumferential direction of the tire an angle of which a absolute value is at least equal to 15° and at most equal to 50°, a radially outermost working layer comprising at least one central undulation in line with at least one central rib with an amplitude at least equal to 1 mm, each central undulation being such that a portion of the radially outermost working layer of the central undulation is radially on an outside of the portion of the radially outermost working layer in line with the bottom faces of the circumferential grooves or of the grooves of the circumferential set of grooves delimiting the central rib in a vertical line above the central undulation concerned,
wherein at least one local reinforcement, comprising at least one layer of reinforcing elements that are mutually parallel and make with the circumferential direction of the tire an angle of which the absolute value is at most equal to 5°, is vertically in line with at least one central undulation of the radially outermost working layer,
wherein an axial width of each local reinforcement is at least equal to 5 mm and at most equal to an axial width of the central rib in vertical line above the local reinforcement,
wherein a force at break of the reinforcing elements of each local reinforcement is at least equal to 20 daN, and wherein an axial distance between two contiguous reinforcing elements of the local reinforcement is at most equal to 0.4 mm.

2. The tire according to claim 1, wherein an amplitude of each central undulation of the radially outermost working layer is at least equal to 1.5 mm and at most equal to 5 mm.

3. The tire according to claim 1, wherein the local reinforcement is radially on an outside of the carcass reinforcement, radially on an inside of a radially innermost working layer.

4. The tire according to claim 1, wherein the radially outermost working layer comprises a central undulation in line with each central rib, each central undulation being vertically in line above a local reinforcement.

5. The tire according to claim 1, wherein each local reinforcement comprises a layer of reinforcing elements that are mutually parallel and form with the circumferential direction of the tire an oriented angle of which the absolute value is at most equal to 0.5°.

6. The tire according to claim 1, wherein the reinforcing elements of each local reinforcement are made of textile and are mutually parallel.

7. The tire according to claim 1, wherein a force at break of the reinforcing elements of each local reinforcement is at most equal to 120 daN, and an elongation at break Acc of the reinforcing elements of each local reinforcement is at least equal to 6%.

8. The tire according to claim 1, wherein a first local reinforcement is radially on an outside of the carcass reinforcement, radially on an inside of a radially innermost working layer and a second local reinforcement is radially on an outside of the radially innermost working layer and radially on an inside of the radially outermost working layer.

9. The tire according to claim 1, wherein the reinforcing elements of the carcass layer or layers have a meridian curvature of constant sign in line with a narrowest working layer of the crown reinforcement.

10. The tire according to claim 1, wherein an undulation of the radially outermost working layer is present only in line with the central ribs.

11. The tire according to claim 1, wherein an undulation of the radially outermost working layer is present in line with all the ribs of the tread.

12. The tire according to claim 1, wherein a local reinforcement is present in line with all the undulations of the radially outermost working layer.

13. The tire according to claim 1, wherein each undulation of the radially outermost working layer is in vertical alignment above at most one local reinforcement, each local reinforcement being produced by continuously winding a strip of at least two reinforcing elements to generate at most 3 layers of reinforcing elements.

14. The tire according to claim 13, wherein an axial distance between two contiguous reinforcing elements of the local reinforcement is at least equal to 0.2 mm.

* * * * *